(12) United States Patent
Vasseur et al.

(10) Patent No.: US 11,080,619 B2
(45) Date of Patent: Aug. 3, 2021

(54) PREDICTING WIRELESS ACCESS POINT RADIO FAILURES USING MACHINE LEARNING

(71) Applicant: Cisco Technology, Inc., San Jose, CA (US)

(72) Inventors: Jean-Philippe Vasseur, Saint Martin d'uriage (FR); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 880 days.

(21) Appl. No.: 15/864,578

(22) Filed: Jan. 8, 2018

(65) Prior Publication Data
US 2019/0213504 A1 Jul. 11, 2019

(51) Int. Cl.
| | |
|---|---|
| *G06N 99/00* | (2019.01) |
| *G06N 20/00* | (2019.01) |
| *H04L 12/24* | (2006.01) |
| *H04W 88/08* | (2009.01) |
| *G06N 5/02* | (2006.01) |
| *H04W 24/04* | (2009.01) |

(Continued)

(52) U.S. Cl.
CPC ............. *G06N 20/00* (2019.01); *G06N 5/022* (2013.01); *H04L 41/147* (2013.01); *H04L 41/16* (2013.01); *H04W 24/04* (2013.01); *H04W 36/0016* (2013.01); *H04W 36/16* (2013.01); *H04W 88/08* (2013.01); *H04W 88/12* (2013.01)

(58) Field of Classification Search
CPC ........ G06N 5/022; G06N 20/00; G06N 99/00; G06N 5/02; H04L 41/16; H04L 41/147; H04L 12/24; H04W 88/08; H04W 36/16; H04W 36/0016; H04W 88/12; H04W 24/04
USPC ........................................................ 370/331
See application file for complete search history.

(56) References Cited

U.S. PATENT DOCUMENTS

| | | | | |
|---|---|---|---|---|
| 7,961,857 B2 * | 6/2011 | Zoldi | ................... | H04Q 3/0029 379/114.14 |
| 8,559,607 B2 * | 10/2013 | Zoldi | ................... | H04M 15/58 379/114.14 |

(Continued)

OTHER PUBLICATIONS

Edwards, John., "Predictive analytics: Your key to preventing network failures", https://www.cio.com/article/3207569/predictive-analytics/predictive-analytics-your-key-to-preventing-network-failures.html, Jul. 17, 2017, 3 pages, IDG Communications, Inc.

(Continued)

*Primary Examiner* — Man U Phan
(74) *Attorney, Agent, or Firm* — Behmke Innovation Group LLC; Kenneth J. Heywood; Jonathon P. Western

(57) ABSTRACT

In one embodiment, a network assurance system that monitors a network forms a cluster of similarly behaving wireless access points (APs). The cluster includes APs associated with different software versions. The network assurance system trains a machine learning-based failure prediction model for the cluster based on a set of features of the APs in the cluster. The network assurance system proactively triggers a client in the network to roam from a first AP to a second AP, based on the failure prediction model predicting a failure of the first AP. The network assurance system quarantines the failure prediction model when a new software version is associated with one or more of the APs.

20 Claims, 14 Drawing Sheets

(51) Int. Cl.
*H04W 36/00* (2009.01)
*H04W 36/16* (2009.01)
*H04W 88/12* (2009.01)

(56) References Cited

U.S. PATENT DOCUMENTS

| | | | | |
|---|---|---|---|---|
| 8,824,648 | B2* | 9/2014 | Zoldi | H04Q 3/0029 |
| | | | | 379/114.14 |
| 9,066,251 | B2* | 6/2015 | Madan | H04W 24/10 |
| 9,483,338 | B2* | 11/2016 | Bhalla | G06N 5/04 |
| 10,354,332 | B2* | 7/2019 | Trainor | G06Q 40/08 |
| 10,355,938 | B2* | 7/2019 | Saha | H04L 41/12 |
| 10,484,255 | B2* | 11/2019 | Di Pietro | H04L 43/0817 |
| 10,572,495 | B2* | 2/2020 | Raghavan | G06F 8/60 |
| 10,841,314 | B2* | 11/2020 | Kumaran | H04W 8/18 |
| 2008/0250265 | A1* | 10/2008 | Chang | G06F 11/0709 |
| | | | | 714/4.12 |
| 2013/0010610 | A1* | 1/2013 | Karthikeyan | H04L 41/16 |
| | | | | 370/242 |
| 2014/0222996 | A1* | 8/2014 | Vasseur | H04L 41/16 |
| | | | | 709/224 |
| 2016/0373306 | A1 | 12/2016 | Saha et al. | |
| 2017/0091870 | A1 | 3/2017 | Trainor et al. | |

OTHER PUBLICATIONS

Gu, et al., "Toward Predictive Failure Management for Distributed Stream Processing Systems", The 28th International Conference on Distributed Computing Systems, 2008. ICDCS '08, 2008, pp. 825-832, IEEE.

Vilalta, et al., "Predictive algorithms in the management of computer systems", IBM Systems Journal (vol. 41, Issue: 3, 2002), 2002, pp. 461-474, IBM.

"Network Technologies (NTECH); Autonomic network engineering for the self-managing Future Internet (AFI); Scenarios, Use Cases and Requirements for Autonomic/Self-Managing Future Internet", ETSI TS 103 194 V1.1.1 (Oct. 2014), http://www.etsi.org/deliver/etsi_ts/103100_103199/103194/01.01.01_60/ts_103194v010101p.pdf, Oct. 2014, 67 pages, ETSI.

* cited by examiner

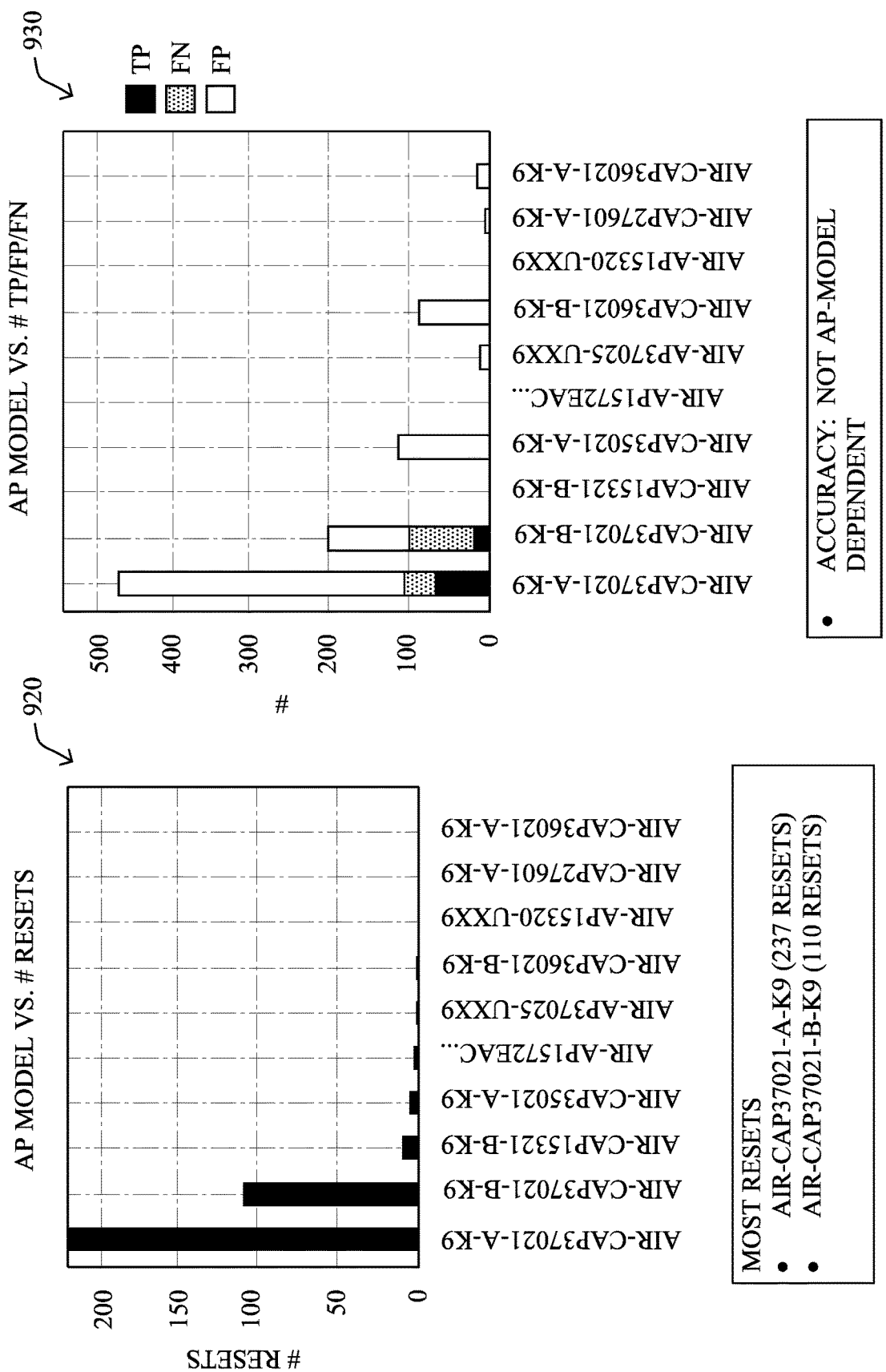

US 11,080,619 B2

PREDICTING WIRELESS ACCESS POINT RADIO FAILURES USING MACHINE LEARNING

TECHNICAL FIELD

The present disclosure relates generally to computer networks, and, more particularly, to predicting wireless access point radio failures using machine learning.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 9A-9D illustrate example test results comparing controller and AP versions.

DESCRIPTION OF EXAMPLE EMBODIMENTS

Overview

Figure 1A:
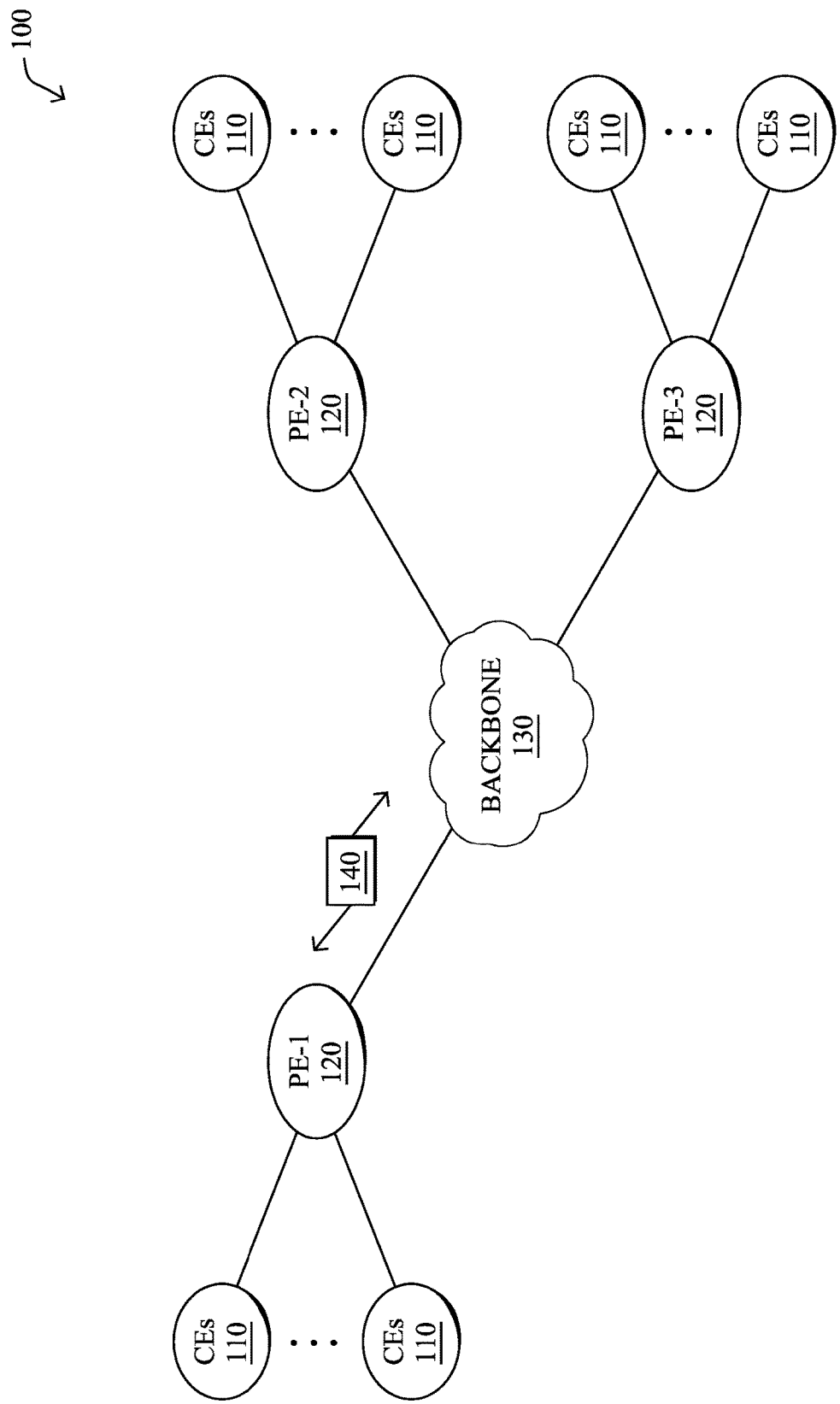
FIGS. 1A-1B illustrate an example communication network.

According to one or more embodiments of the disclosure, a network assurance system that monitors a network forms a cluster of similarly behaving wireless access points (APs). The cluster includes APs associated with different software versions. The network assurance system trains a machine learning-based failure prediction model for the cluster based on a set of features of the APs in the cluster. The network assurance system proactively triggers a client in the network to roam from a first AP to a second AP, based on the failure prediction model predicting a failure of the first AP. The network assurance system quarantines the failure prediction model when a new software version is associated with one or more of the APs.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
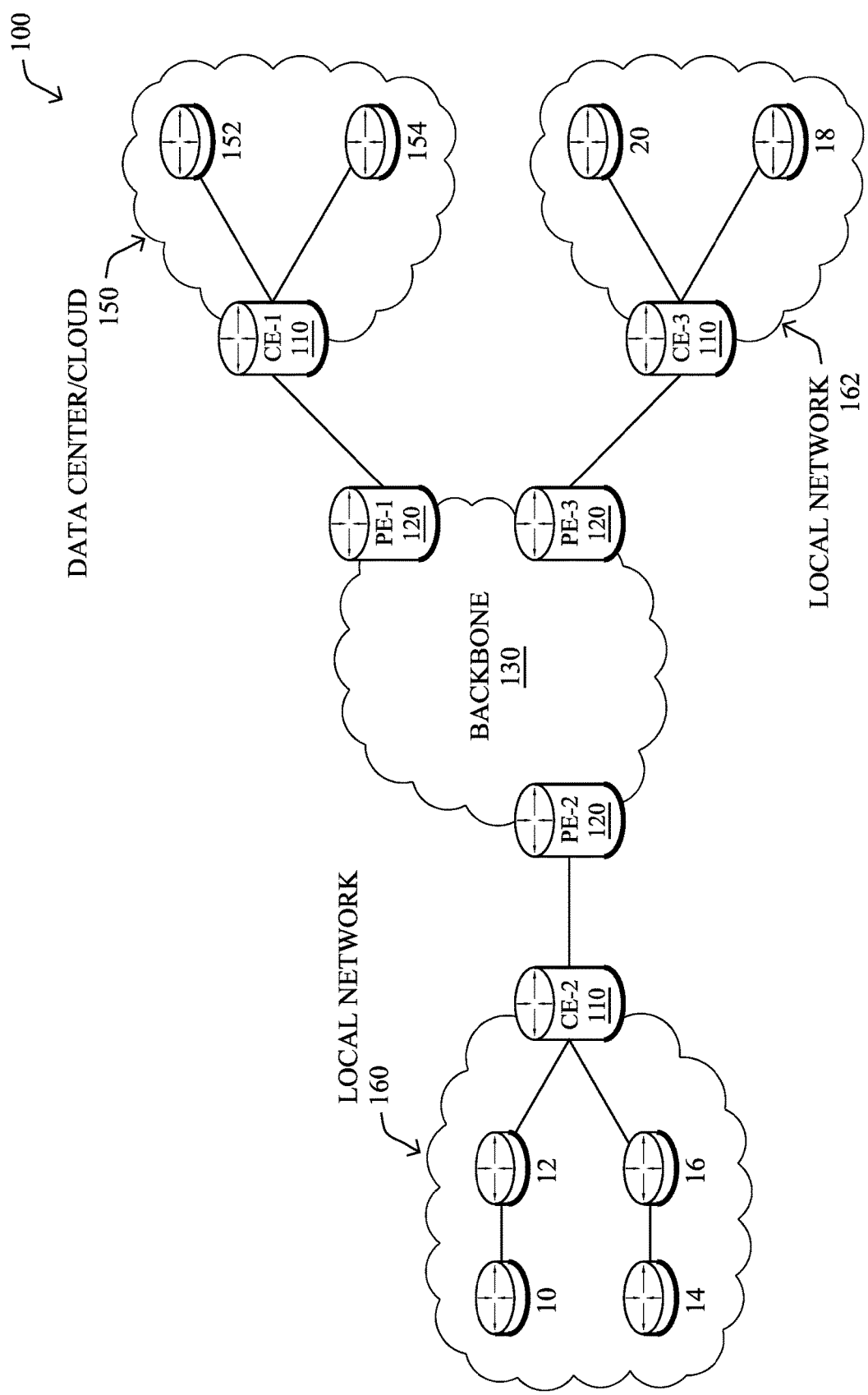

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
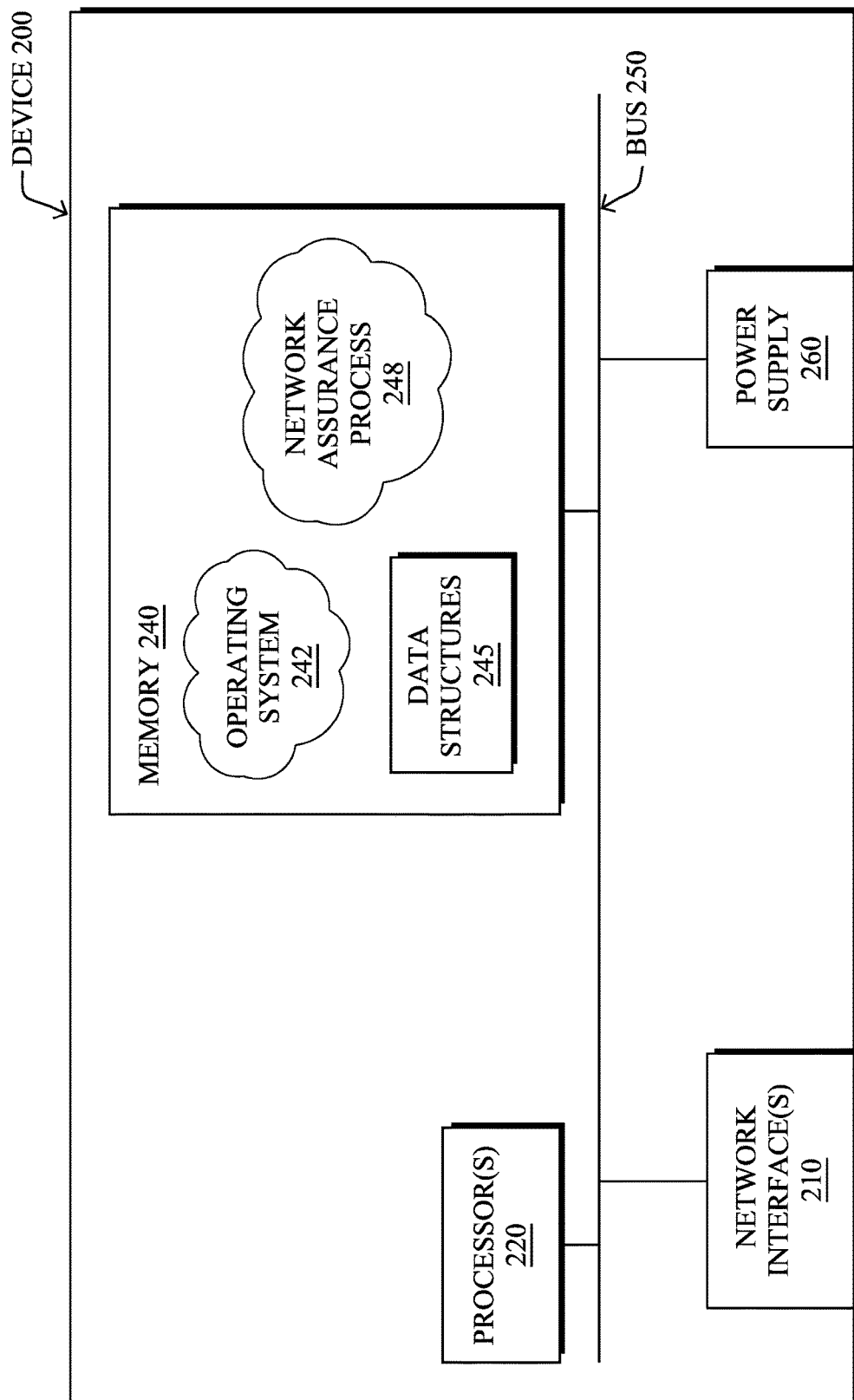
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
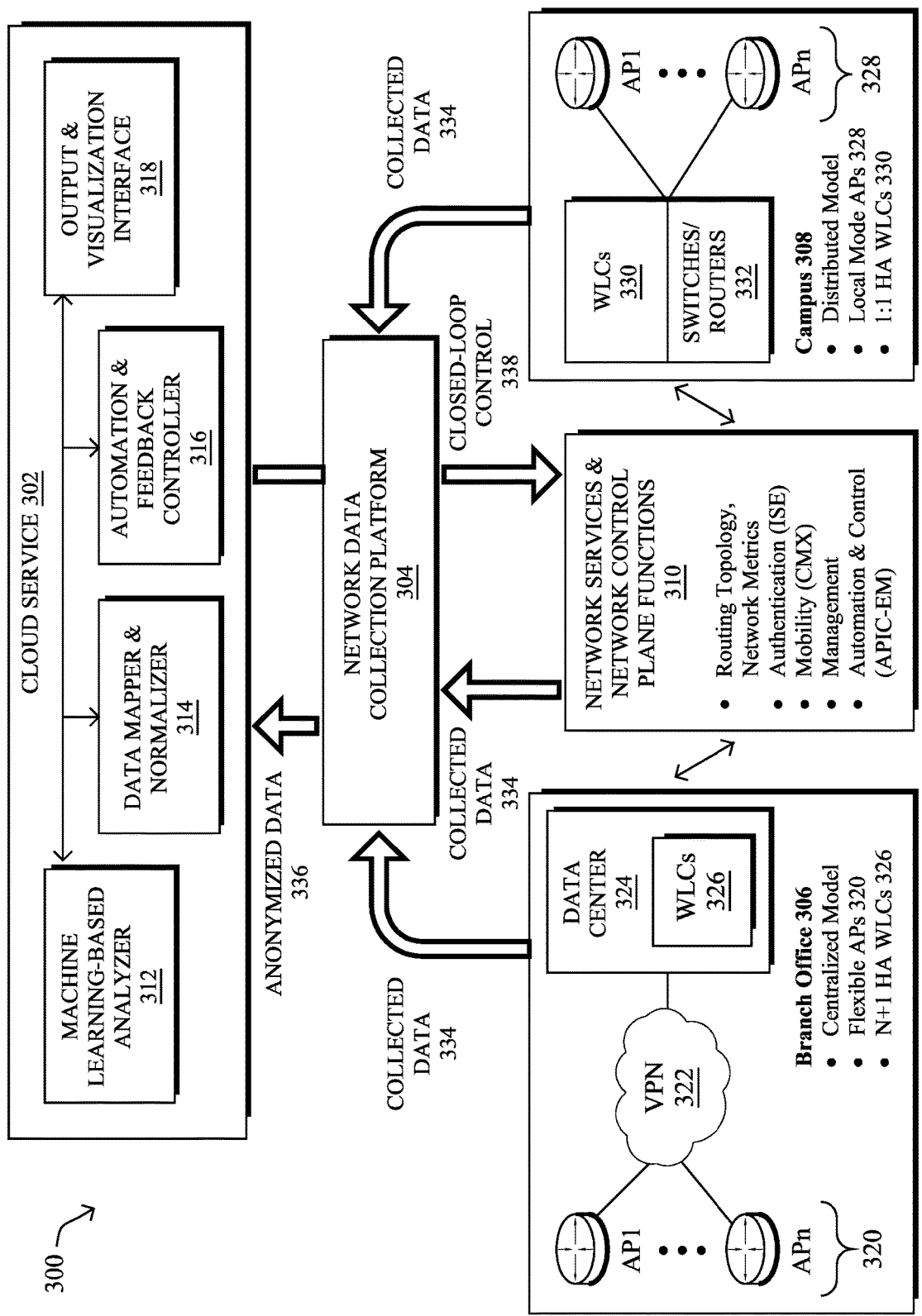
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, the volume and types of application traffic in a network is ever increasing. Accordingly, a number of business-critical applications have emerged that have very stringent networking requirements (e.g., poor network performance could cause a videoconferencing application to freeze or drop connection, etc.). To this end, network control planes have been enhanced so as to quickly detect link and node failures thanks to mechanisms such as fast keep-alive, bidirectional forwarding detection (BFD), and the like, allowing for signal loss detection. Routing protocols have also been improved to quickly make use of repair path using both protection and restoration (e.g., Optical 1+1, GMPLS, IP FRR, MPLS FRR, etc.) and data planes have been enhanced so as to be able to quickly switch traffic onto backup path so as to limit the impact of link/node failures.

With the machine learning-based network monitoring and assurance introduced herein, it may become possible to predict (forecast) networking gear failures with acceptable accuracy, thus allowing for a smooth (non-disruptive) switch of traffic onto backup (alternate) paths even before the failure takes place. As always, there are trade-offs between being able to switch traffic before failure and, thus, completely avoid any disruption of traffic, and potentially inappropriately triggering such a process if the failure does not take place, which will unavoidably happen in presence of an incorrect prediction (e.g., false positives).

Predicting Wireless Access Point Failures Using Machine Learning

The techniques herein allow for the training of machine learning-based, predictive failure models in a cloud-based environment using gathered telemetry regarding wireless AP radio failures (e.g., time, type of failure, etc.) that is augmented with network and AP state information. In some aspects, a clustering approach can be used to group devices with different associated software versions based on their behavioral similarity and a failure prediction model can be trained for a cluster. In further aspects, such a failure prediction model can be used to dynamically signal to an endpoint client (e.g., wireless device) of a forecasted failure along with the probability of failure and predicted time. Such information may be used to trigger a smooth roam to another AP while taking into account the set of active flows, their required SLA, and/or the probability of failure, forecasted failure times, predicted flow duration, etc.

Specifically, according to one or more embodiments of the disclosure as described in detail below, a network assurance system that monitors a network forms a cluster of similarly behaving wireless access points (APs). The cluster includes APs associated with different software versions. The network assurance system trains a machine learning-based failure prediction model for the cluster based on a set of features of the APs in the cluster. The network assurance system proactively triggers a client in the network to roam from a first AP to a second AP, based on the failure prediction model predicting a failure of the first AP. The network assurance system quarantines the failure prediction model when a new software version is associated with one or more of the APs.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Operationally, the techniques herein introduce a set of mechanisms that allow for the prediction of wireless access point (AP) radio failures and the proactive mitigation of their effects on client devices. The consequences of a radio failure in a wireless environment, such as Wi-Fi, are quite severe: first the client must detect by itself the AP failure (e.g., a missing beacons), then select an alternate AP obtained from a previous scan of the network (or with some driver, restart a full scan and then a probe to best selected AP), before re-associating with a new AP, which still take a few seconds even with fast roaming.

Figure 4:
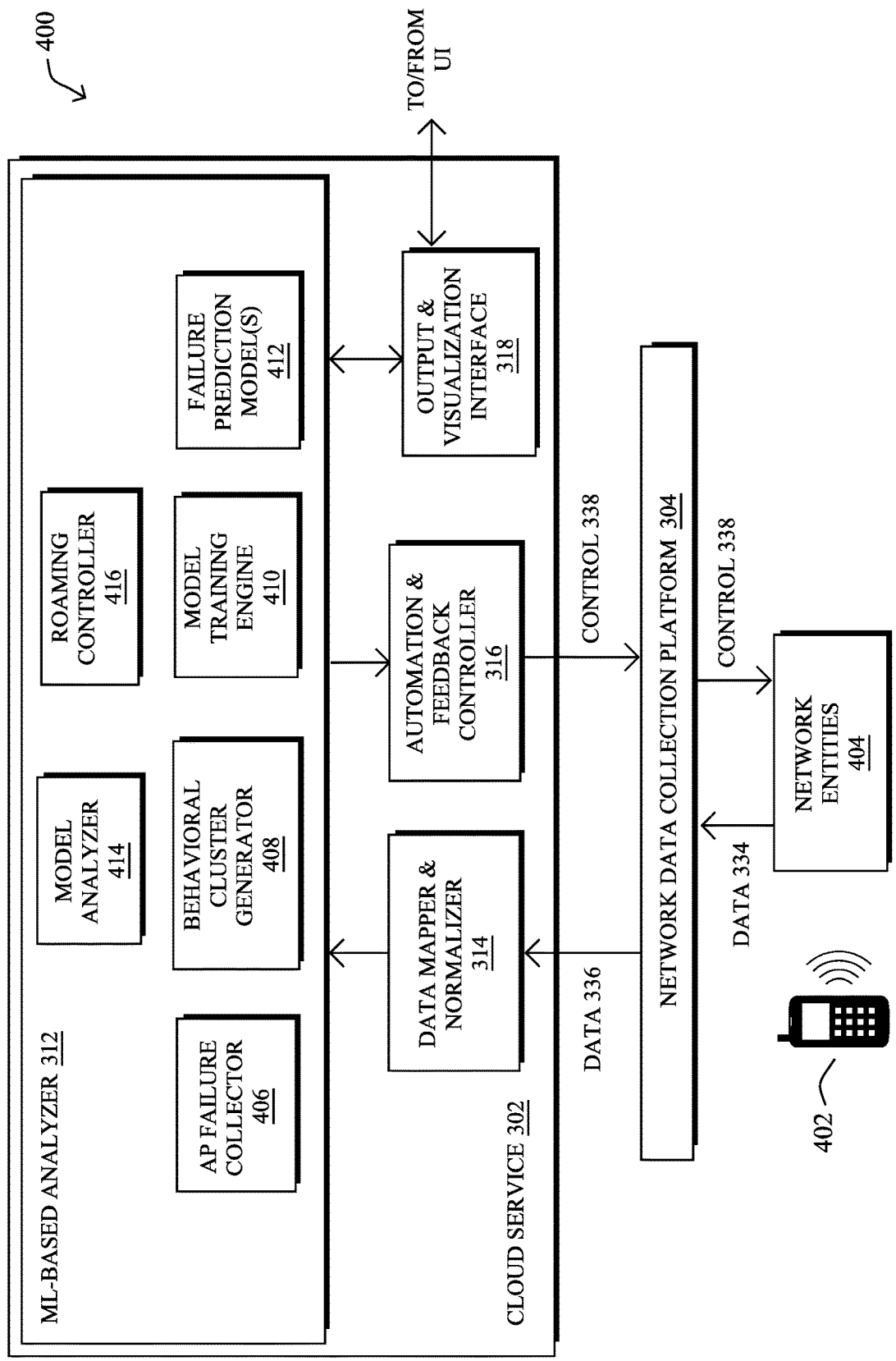
FIG. 4 illustrates an example architecture for predicting wireless access point (AP) failures in a network assurance system.

Operationally, FIG. 4 illustrates an example architecture 400 for predicting wireless AP failures in a network assurance system, according to various embodiments. At the core of architecture 400 may be the following components: an AP failure collector 406, a behavioral cluster generator 408, a model training engine 410, one or more failure prediction models 412, a model analyzer 414, and a roaming controller 416. In some implementations, the components of architecture 400 may be implemented within a network assurance system, such as system 300 shown in FIG. 3. Accordingly, the components 406-416 of architecture 400 shown may be implemented as part of cloud service 302 (e.g., as part of machine learning-based analyzer 312), as part of network data collection platform 304, and/or on one or more network elements/entities 404 that communicate with one or more client devices 402 within the monitored network itself. Further, these components may be implemented in a distributed manner or implemented as its own stand-alone service, either as part of the local network under observation or as a remote service. In addition, the functionalities of the components of architecture 400 may be combined, omitted, or implemented as part of other processes, as desired.

During operation, AP failure collector 406 may gather the set of labels regarding radio failures exhibited by APs in the monitored network (e.g., network entities 404). A number of conditions can cause a client device to lose connectivity with its AP: 1.) software failures (e.g., jammed transmission queues, reception queues overrun, bad pointers, etc.) leading to an AP failure followed by a reset of the radio, 2.) configuration changes, and/or 3.) intentional resets triggered by other network entities 404, such as a radio resource manager (RRM).

In order to train the machine learning model with appropriate data, AP failure collector 406 may use complex logic to select the actual failures, that is, software failures leading to a reset, from these events and filter out all other resets (e.g., resets triggered by configuration changes, etc.). Then, for each failure event, AP failure collector 406 may gather the set of required input data from various sources such as logs, and other JSON fields reporting the actual states of the AP before the failure took place, such parameters being used as input feature candidate in the predictive engine.

Figure 5:
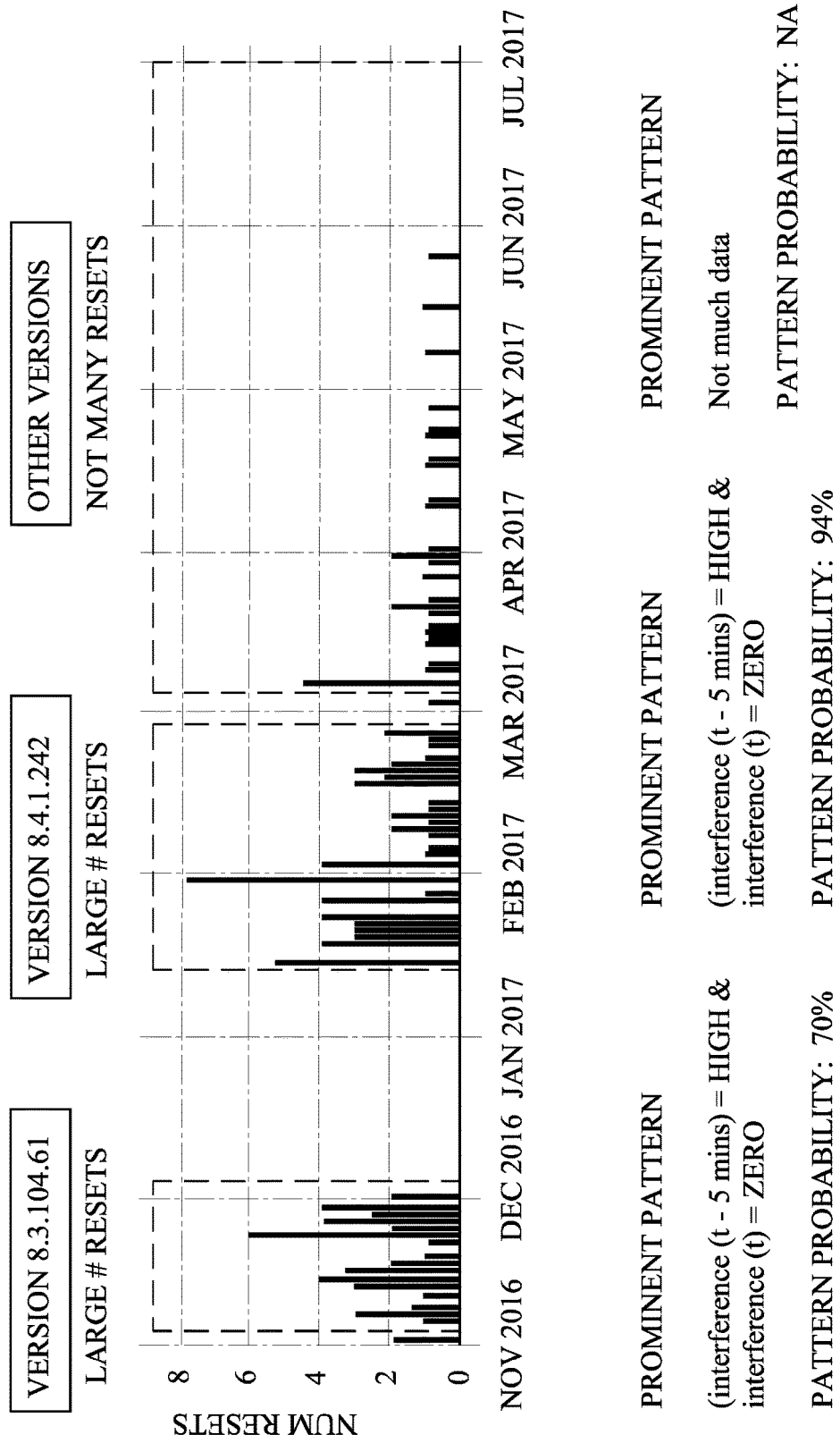
FIG. 5 illustrates example behavioral patterns by APs associated with different software versions.

A key finding from preliminary testing is that prediction models have to be trained for each code release of the AP. Indeed, after deep behavioral analysis, it turns out that AP behaviors may vary significantly between software releases, which requires the use of a different predictive model per type of release. For example, example 500 in FIG. 5 shows the most prominent reset patterns across different code versions. The first two versions had similar patterns, from November 2016 to February 2017. However, the later versions hardly experienced any failures in the same deployments. Using a previously trained model in March 2017 would have led to predicting a large number of failure events that actually do not occur (e.g., model false positives). Such a large number of false positives would be of little use in mitigating the effects of the AP failures.

However, training one model for each version of the software release may also be too cumbersome for deployment. Accordingly, in some embodiments, behavioral cluster generator 408 may assign each new AP release to a behavioral cluster of APs. In other words, behavioral cluster generator 408 may group any number of APs associated with different software versions into a single cluster/group, if the APs exhibit similar behaviors in the network. Note that the software version may be for software of the AP itself or, alternatively, of the WLC that controls the AP. In one embodiment, behavioral cluster generator 408 may compute the clusters using an unsupervised clustering mechanism, such as k-means, so as to characterize the AP behavior according to its release. When a new AP is released, behavioral cluster generator 408 may gather a number of parameters from the monitored network that are representative of the AP behavior in normal operating mode (e.g., not in presence of failures). In turn, behavioral cluster generator 408 may assign each release to a behavioral cluster, thereby allowing for the training of a single failure prediction model per cluster, as opposed to per release. Of course, if a new OS or other software release is too distant behaviorally from any existing cluster, behavioral cluster generator 408 may create a new behavioral cluster for the APs associated with that release, leading to the training of a new failure prediction model.

In various embodiments, model training engine 410 may perform offline training, to train one or more machine learning-based, failure prediction models 412, per behavioral cluster generated by behavioral cluster generator 408.

For example, failure prediction models 412 may be boosted tree models that are trained by model training engine 410 using a wide variety of features. Example features that can be collected and used for model training may include, but are not limited to, any or all of the following:

TABLE 1

| Feature | Type |
| --- | --- |
| Channel | categorical |
| channelWidth | categorical |
| customerId | categorical |
| wlcId | categorical |
| adminStatus | categorical |
| apGroup | categorical |
| Location | categorical |
| Mode | categorical |
| Model | categorical |
| operStatus | categorical |
| Submode | categorical |
| wlcVersion | categorical |
| dayOfWeek | categorical |
| gHzBand | categorical |
| activeAppCount | continuous |
| avgClientRssi | continuous |
| avgClientSnr | continuous |
| blockAckJumpBytesProfile | continuous |
| channelChangeCount | continuous |
| clientCount | continuous |
| datarate | continuous |
| deltaRxBytes | continuous |
| deltaTxBytes | continuous |
| distinctClientCount | continuous |
| interference | continuous |
| levelBytesProfile | continuous |
| lowRssiClientCount70 | continuous |
| lowRssiClientCount75 | continuous |
| lowRssiClientCount80 | continuous |
| lowRssiClientRatio70 | continuous |
| lowRssiClientRatio75 | continuous |
| lowRssiClientRatio80 | continuous |
| maxClientRateBytesProfile | continuous |
| minClientRssi | continuous |
| minClientSnr | continuous |
| packetFailureRate | continuous |
| power | continuous |
| priorityQDiscarded | continuous |
| priorityQFailed | continuous |
| priorityQSent | continuous |
| quotaFullBytesProfile | continuous |
| rssiBytesProfile | continuous |
| rxBytesPerSec | continuous |
| seqNumCntBytesProfile | continuous |
| snrBytesProfile | continuous |
| spatialStreamBytesProfile | continuous |
| speedBytesProfile | continuous |
| totalBytesPerSec | continuous |
| traffic | continuous |
| txBytesPerSec | continuous |
| crashCount | continuous |
| softResetCount | continuous |
| upTimeDeltaInSec | continuous |
| connectedTimeDeltaInSec | continuous |
| hourOfDay | continuous |

Note that failures are usually very rare events. For example, the failure-periods to non-failure periods observed during prototyping was approximately 1:7000. Hence, model training may have to be performed judiciously, so as to prevent the use of heavily unbalanced training data. In particular, random oversampling of the failures (e.g., by replicating one radio failure event 7000 times) leads to two issues: 1.) it bloats the training dataset to very large number of rows, which makes the learning algorithm slow, and 2.) very rare events are replicated by a large factor, thus possibly overfitting. To account for this, model training engine 410 may sub-sample/under-sample the non-failure events, in some cases, since there are likely a very large number of non-failure events. However, random sub-sampling may not always be effective, as failures may only occur on a subset of the radios. For example, it was determined during testing that only 1.5% of the radios actually experienced failures.

In various embodiments, model training engine 410 may employ a radio- and failure-period aware subsampling technique to make sure that a subset of non-failure events are selected for model training that are representative of both failed and non-failed radios. More specifically, model training engine 410 may first fix an imbalance ratio of n-number of non-failure events for every failed event (e.g., n=1000). Then, model training engine 410 may choose a fraction 'f' of the samples (e.g., n/2 of the number of failures) from radios that have not failed, and fraction (1−f) from the failed radios, but during the times when these radios did not experience the failure.

Once a failure prediction model 412 has been trained by model training engine 410, a model quarantine approach may be taken by model analyzer 414, to progressively monitor and refine the model. More specifically, in various embodiments, model analyzer 414 may employ a dynamic approach whereby a failure prediction model 412 is reused until: 1.) certain threshold of new failures are seen (say, 3 failures, etc.), and/or 2.) software versions associated with the AP(s) have changed. Upon detecting event (1) above, model analyzer 414 may signal model training engine 410 to retrain the model 412 using training data up to the current date. In the case of event (2), model analyzer 414 may put the model 412 into a "quarantine" mode.

While in quarantine mode, model analyzer 414 may monitor the results of the failure prediction model 412 and the actual failures exhibited by the APs affected by a new hardware or software change. If the failure pattern does not change with respect to the behavioral cluster on which the model 412 was trained, model analyzer 414 may un-quarantine the model 412 and allow it again to be used. However, if model analyzer 414 determines that the version change results in a different failure pattern, then model analyzer 414 may signal to model training engine 410 that retraining of the model 410 is needed. In turn, model training engine 410 may discard the old training data for the model 410 and retrain the model using training data obtained from when the version change was enacted.

In some cases, model analyzer 414 may assess the need to quarantine a given failure prediction model 410 using the precision/recall curve for the model. For example, model analyzer 414 may make a local policy-based decision to assess whether the performance of the failure prediction model 410 is high enough for a given release/behavioral cluster. As always, there is a tension between precision and recall. Notably, high precision allows for avoiding false positive (a predicted failure does not happen) and high recall allows for avoiding false negative (a failure happens that was not predicted).

In some embodiments, model analyzer 414 may employ the use of an objective function to decide whether to optimize for false positives or false negatives, governed by a control loop corrective action. Indeed, suppose that a failure predicted by a failure prediction model 410 triggers a disruptive action in the network. For example, consider the case whereby the incorrect failure prediction causes all clients attached to an AP to be rerouted to another AP, thus causing a failure. In such a case, the consequences of a false positive by the model 410 are not negligible. Conversely, a false negative by the model 410 is no different than the base mode of operation without the prediction. In this situation, it may be preferable for model analyzer 414 to optimize the model 410 for high precision at the price of increasing the false negatives and, thus, also decreasing the recall.

In other cases, model analyzer 414 may instead ensure that a failure prediction model 410 has high recall, even if this increases the number of false positives. For example, this may be acceptable if the client 402 has as alternate 4G link that can be used when AP connectivity is lost. Such a decision in terms of optimization may be governed by a policy of model analyzer 414.

In another embodiment, re-training of a failure prediction model 410 can be triggered on-the-fly by cloud service 302 upon detecting new failures in the network. For example, a custom signal can then be sent by the failing network entity 404 (e.g., AP, or the WLC with which the AP is associated), so as to signal the failure, accompanied with the required logs and other files reporting the status of the AP before the failure. In one embodiment, such notification is systematic. In another embodiment, cloud service 302 may explicitly request additional labels for models that do not yet have good enough precision (e.g. not enough labels), as determined by model analyzer 414.

Another aspect of the techniques herein is the use of a failure prediction model 410 to trigger smooth roaming of a wireless client, such as client 402. In a typical scenario, a client would first detect the lack of a wireless beacon from an AP, thus indicating a failure of the AP. In turn, the client would then search for an alternate AP and re-associate and re-authenticate with the new AP. However, in various embodiments, when a failure prediction model 410 predicts that a first AP will fail, roaming controller 416 may cause that AP to signal the predicted failure to all clients associated with the AP. For example, the AP may send out a custom type-length-value (TLV) IEEE 802.15.4 extension with an indication of the predicted failure, thereby allowing the attached clients to proactively roam to another AP before the current AP fails.

In some embodiments, roaming controller 416 may optionally cause the affected AP to also report a likelihood of failure computed according to the score of failure prediction model 410 to the clients. In turn, such a score may be used by the client to decide whether to perform a smooth roam (e.g., de-associate and re-associate to another AP), which is somewhat disruptive for some real-time application (e.g. VoIP). Depending on the score reflecting the probability of failure, the client may decide (or not) to trigger a smooth roaming. Additionally, roaming controller 416 may also cause the AP to indicate the predicted time of failure to the client(s). If the client makes use of machine learning to predict flow durations, for example, such an indication may be advantageously combined with the failure likelihood score to decide whether to roam to another AP.

For the sake of illustration, if client 402 has one business critical session (remaining predicting duration of D mn), and the predicted failure time is T with T<Current_time+D and the score reflecting the probability of failure is 0.8 (high), then client 402 may decide to interrupt its current connection and perform a smooth roam to another AP in network entities 404. Other complex policies implemented on client 402 may also be used to decide whether to perform roaming.

In yet another embodiment, roaming controller 416 may signal to client 402 an alternate suggested AP capable of providing equivalent SLAs for the active applications of client 402. Notably, roaming controller 416 may be configured to determine whether clients impacted by the triggered roaming would have an alternate AP available. Indeed, consider the case of a failure of an AP1 being predicted by a model 410 and, as described earlier, roaming controller 416 causes AP1 to indicate this predicted failure to all of its connected clients. In such a case, roaming controller 416 may send a custom message to AP1 that indicates whether alternative APs are available to the clients. Such information could be used, for example, to determine whether to actually trigger roaming by the clients, according to policy. For example, AP1 may only signal the predicted failure to its clients if and only if 80% of its clients have alternative APs to which they can roam.

A prototype system was constructed using the above techniques whereby datasets from a large set of network deployments were collected in the cloud and features were computed across the datasets, as described above. A periodic learning approach was then used as follows:

A model was trained using features collected from an initial start time, $t_0$ (e.g., when the first sample was seen) to $t_0+20$ days. In turn, the model was used to predict the radio resets on day $t_0+21$ day. Note that prediction is still for the 5-minute look-ahead. However, the same model was used for every prediction on the $t_0+21^{st}$ day. There is an important advantage by using the model to predict for just 1 day, as the machine learning was applied to a very large dataset. Hence, sampling all points would be too cumbersome, which also implies that the 1:7000 imbalance cannot be maintained while learning. So, sub-sampling was performed while learning with an imbalance ratio of 1:1000. This sub-sampling was then relaxed on the test data (since one day does not have too many points, and predict on it, and export it as a spark-frame). This allows the real PR curves to be determined on the actual imbalanced data.

Re-learning was then performed on all data from $t_0$ to $(t_0+21)$ days (simulate daily learning), and used to predict for day $t_0+22$. This was repeated until each dataset was predicted.

Finally, all test data was aggregated and analyzed.

Figure 6:
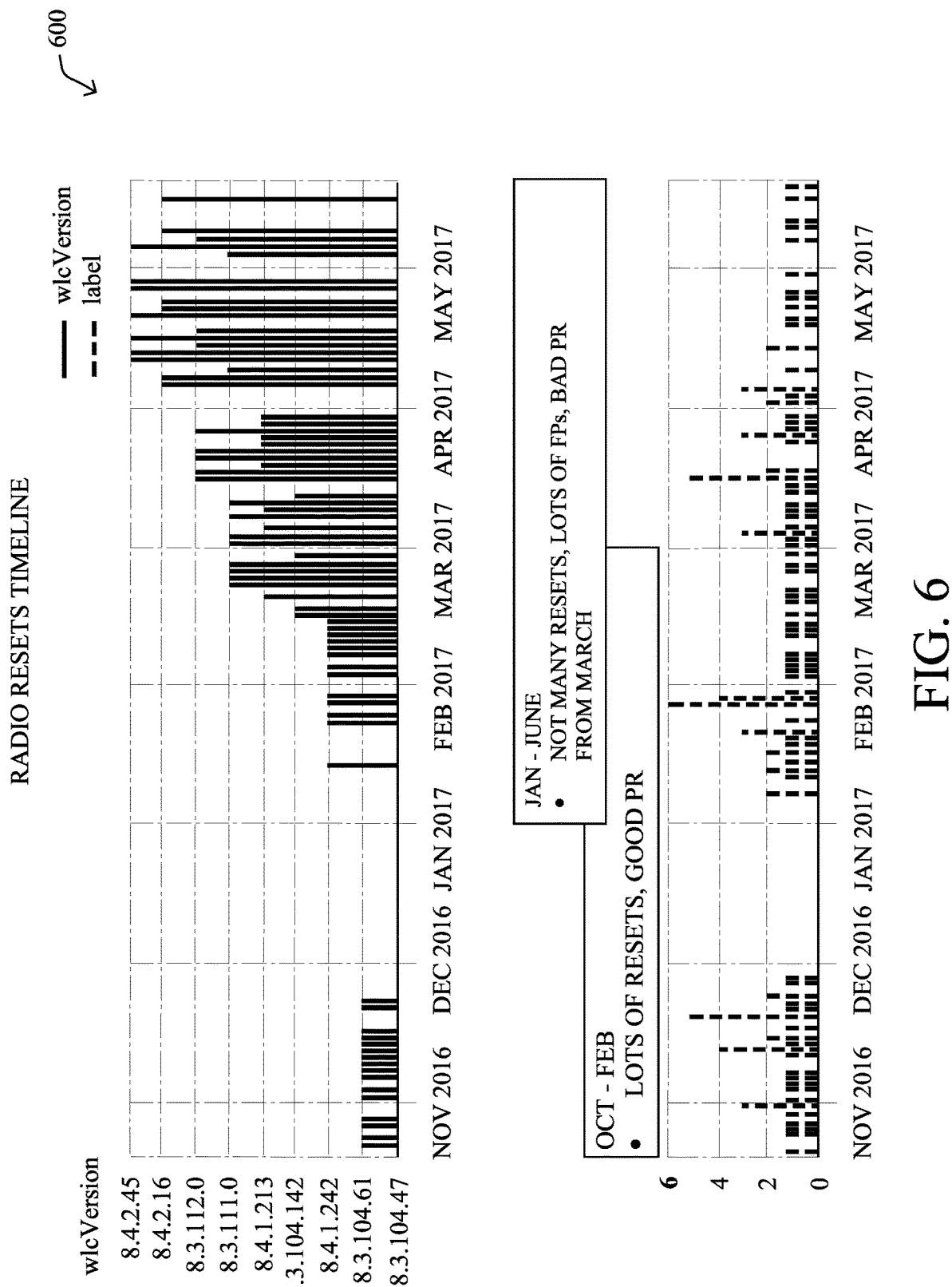
FIG. 6 illustrates example test results for two time periods.

More specifically, as shown in plot 600 of FIG. 6, two batches of runs were performed: one from October-February and a second from January to June. The reason for this split was two-fold:

Very good accuracy was observed with UBC versions from October to February, providing the best-case scenario for detection.

One model was run every day, leading to a huge amount of simulation time.

Figure 7A:
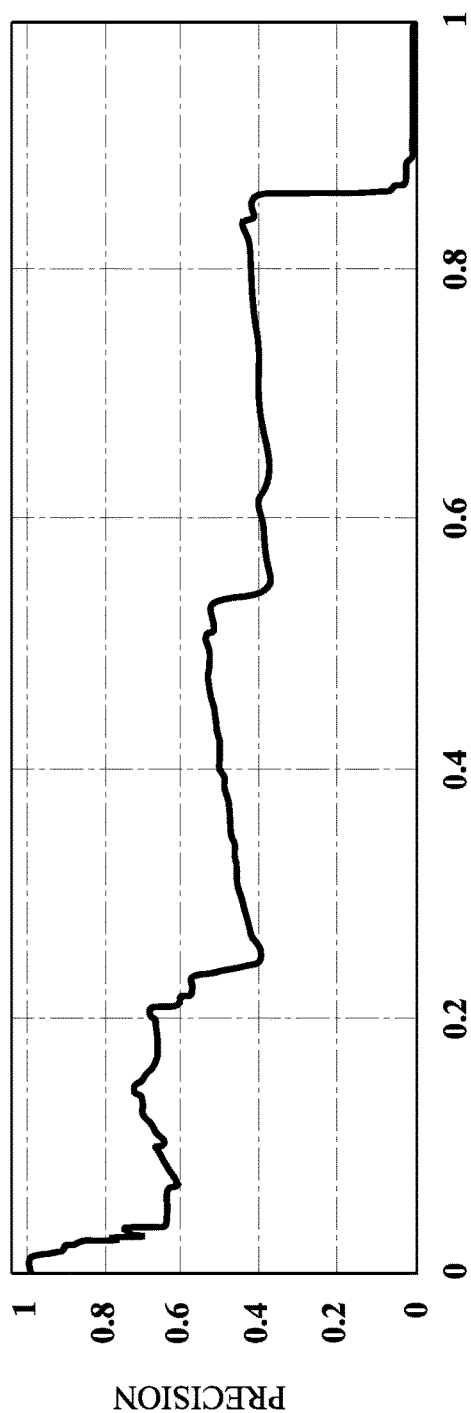
FIGS. 7A-7C illustrate example test results for the first time period.
Figures 7B, 7C:
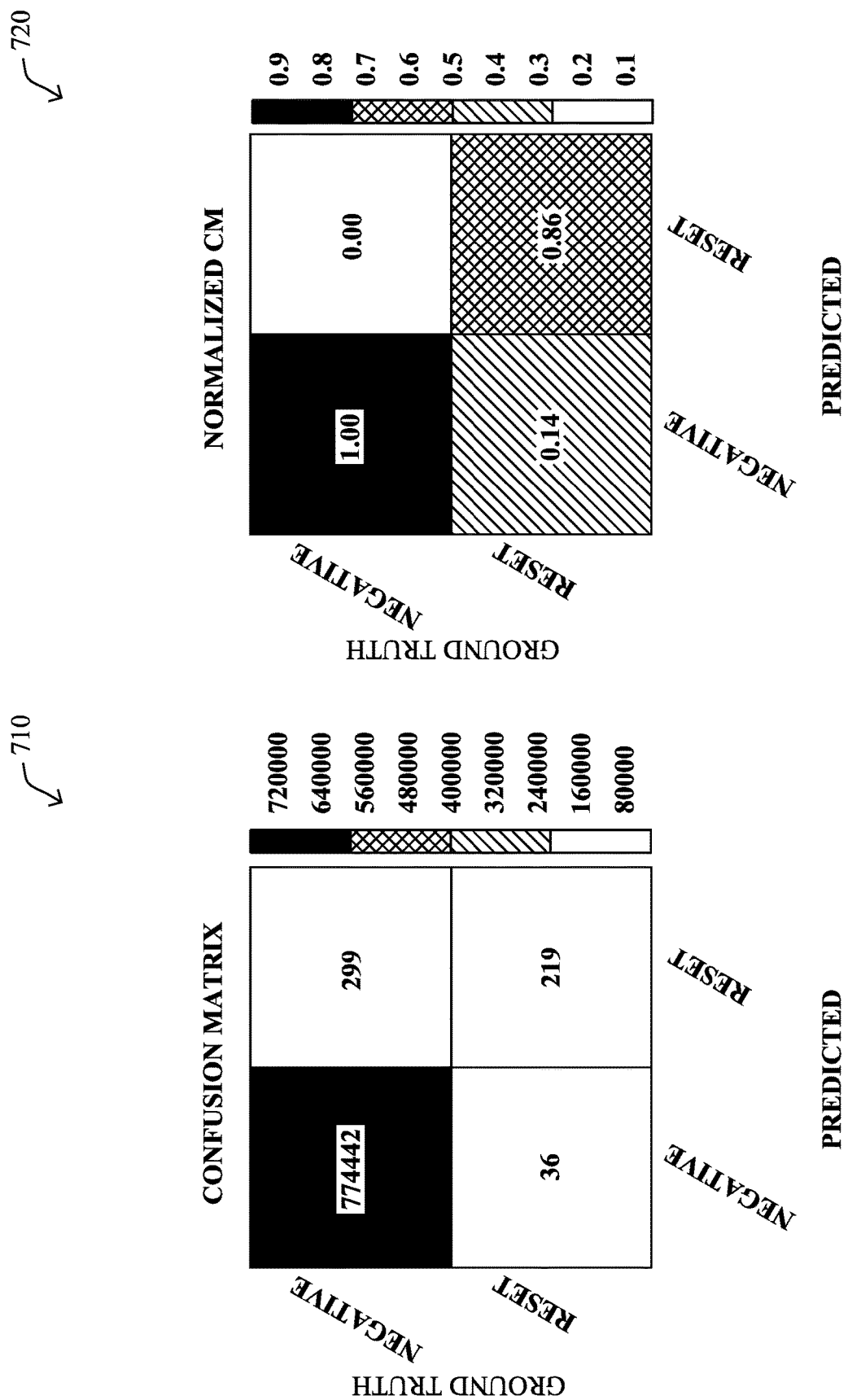

FIGS. 7A-7C illustrate example test results for a first time period between October to February. As shown in FIG. 6, the dataset from this time period was dominated by two WLC software versions: 8.3.104.61 until December, and 8.4.1.242 until the end of February. FIG. 7A illustrates the resulting precision-recall curve 700 for this time period. From this testing, it was found that a vast majority of ground truth (GT)-positives during this time period have a very high prob-positive. However, the prob-positive distribution for GT-negatives is very low. This shows a good separation. Notably, approximately 205 positive points have high prob-pos (>0.92). However, there were also approximately 265 negative points which decreased the max precision attained.

FIGS. 7B-7C illustrate the actual confusion matrix 710 and normalized confusion matrix 720 for this time period, respectively. Note that there are very few GT-positives when compared to GT-negatives. In this imbalance, it can be seen that the techniques herein are quite suited for the task at hand. Notably, 219 out of (219+36=255) actual GT-positives were detected. In addition, the false positive rate was nearly zero, with only 299 false positives out of approximately 774,000 GT-negatives. However, note that the number of false positives (299) is larger than the number of true positives (219).

Figure 8A:
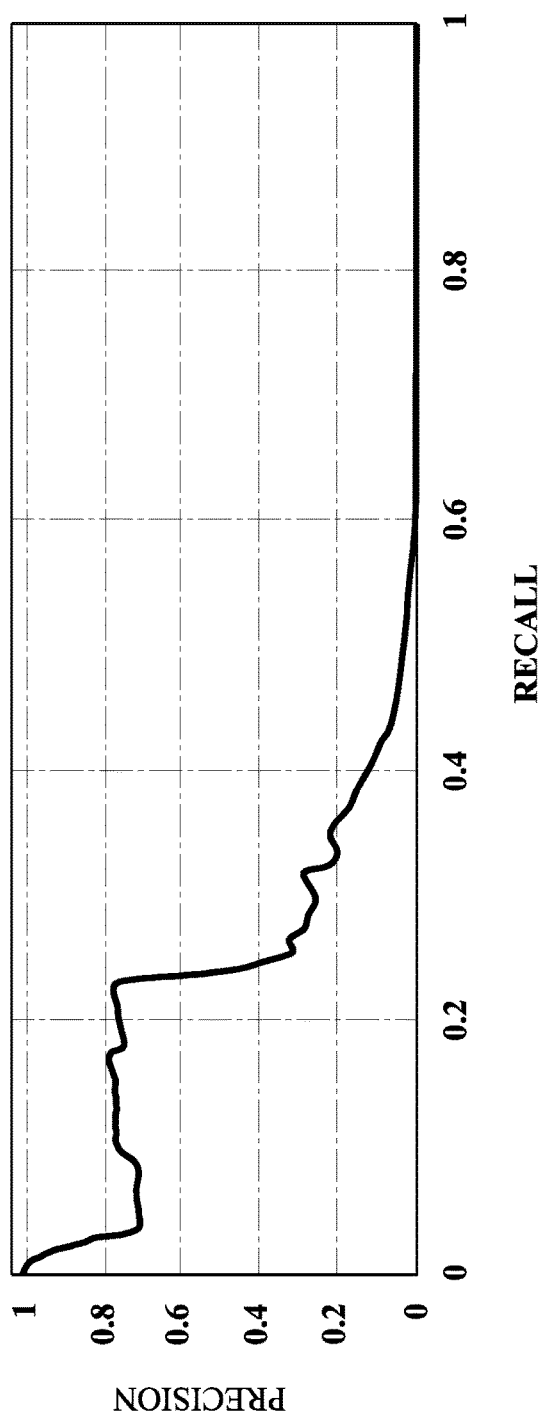
FIGS. 8A-8C illustrate example test results for the second time period.
Figures 8B, 8C:
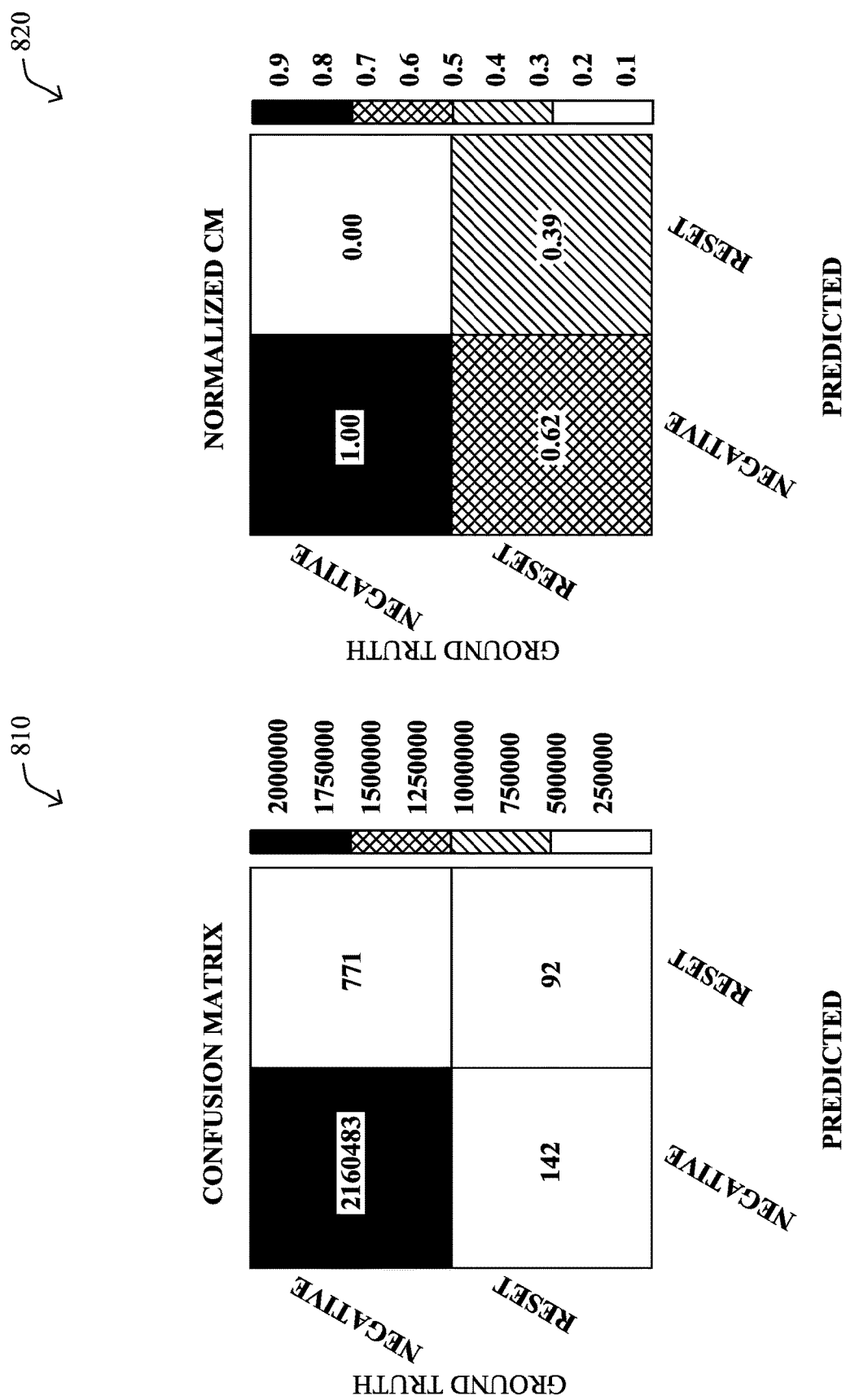

FIGS. 8A-8C illustrate the test results from the second time period between January to June illustrated in FIG. 6. The resulting precision-recall curve 800 for this time period is shown in FIG. 8A. Of first note is that curve 800 is much worse than curve 700 shown in FIG. 7A, with the model only able to achieve a precision=0.8 with a recall of 0.2, which clearly does not meet expectations.

With a cutoff of prob-positive at 0.9, the actual and normalized confusion matrices 810 and 820 are shown in FIGS. 7B-7C, respectively. As shown, the model was only able to achieve approximately a 40% true positive rate and detected only 92 out of 230 radio crashes. Note that the number of false positives is 771 while the number of true positives is only 92, which is not suitable for most deployments.

Figures 9A, 9B:
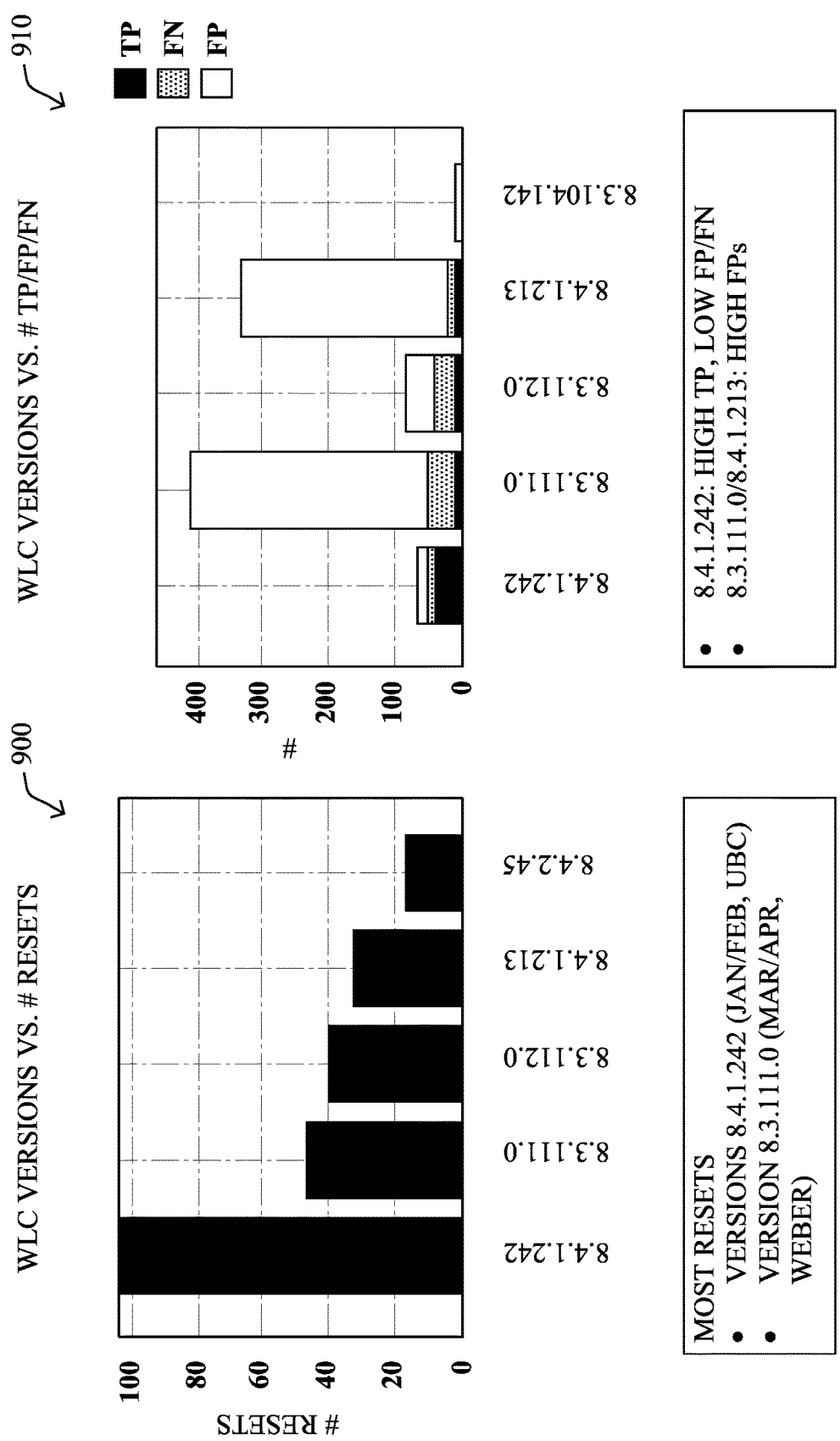

FIGS. 9A-9D illustrate example test results comparing controller and AP versions. More specifically, FIG. 9A illustrates a plot 900 of WLC software version versus the number of observed radio resets. Similarly, plot 910 in FIG. 9B illustrates the results of the failure prediction model with respect to the WLC software version. From these, it can be seen that:

The number of resets observed is a strong function of the version (code-dependence). For example, version 8.4.1.242 which is used by during the January-February time period has large number of resets.

The detection also exhibited good performance for some versions (e.g., 8.4.1.242). However, in other versions, the number of false positives detected was very high.

FIGS. 9C-9D illustrate test results for the AP models. More specifically, plot 920 in FIG. 9C illustrates the AP model versus the number of resets. Plot 930 in FIG. 9D illustrates the AP model versus the number of true positives, false positives, and false negatives. From this, it can be seen that few AP models are more prone to resets. However, in the AP models where there were a large number of true positives, the false positives were also uniformly spread. Hence, there is no strong dependence on the AP-version. However, there is a strong dependence on the software version of the associated WLC, as shown above.

Figure 10:
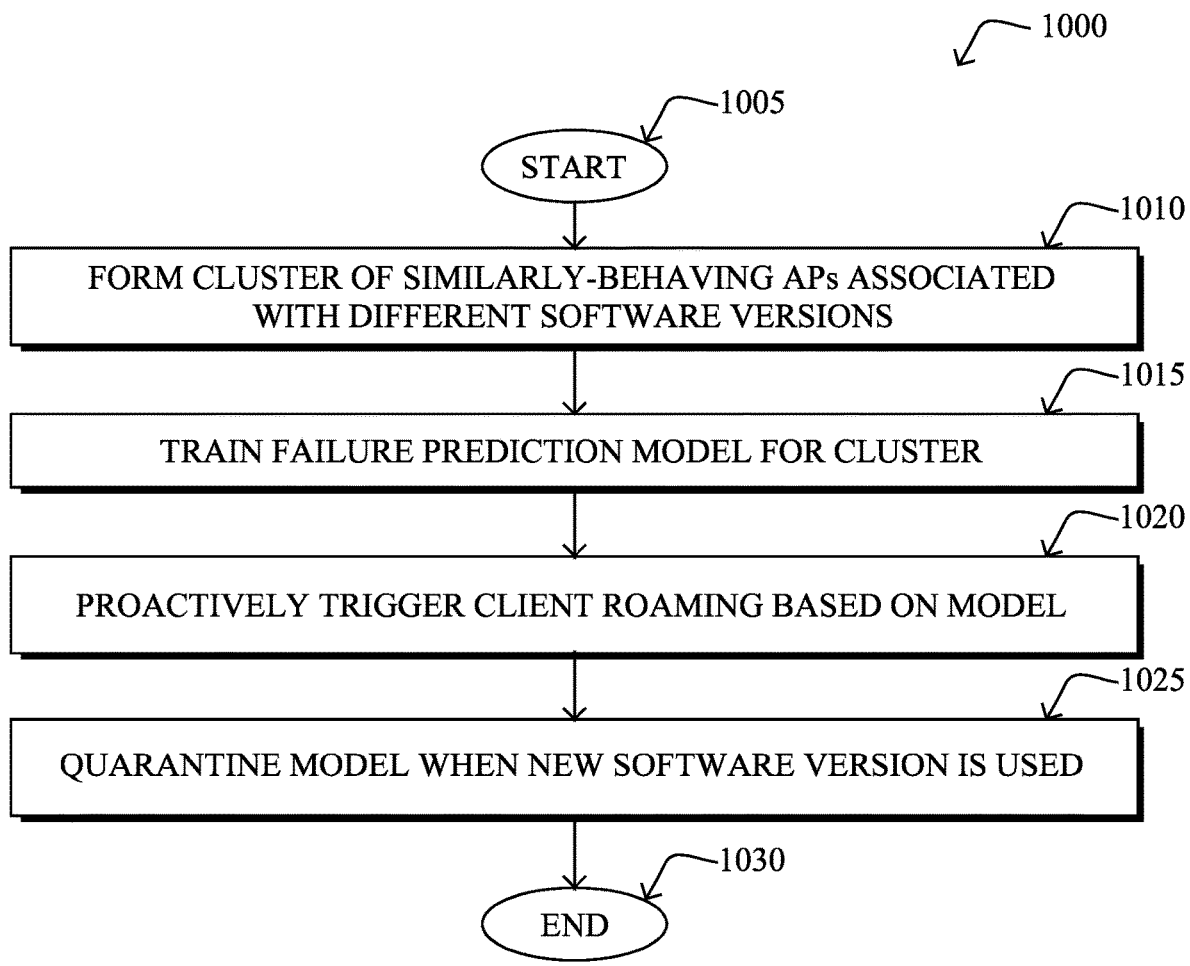
FIG. 10 illustrates an example simplified procedure for predicting wireless AP failures using machine learning.

FIG. 10 illustrates an example simplified procedure for predicting wireless AP failures using machine learning in a network in accordance with one or more embodiments described herein. For example, a non-generic, specifically configured device (e.g., device 200) may perform procedure 1000 by executing stored instructions (e.g., process 248), such as part of a network assurance service that monitors a network. The procedure 1000 may start at step 1005, and continues to step 1010, where, as described in greater detail above, the network assurance service may form a cluster of similarly behaving wireless access points (APs). The cluster may include any number of APs in the network associated with different software versions. In some embodiments, the software versions may be for software directly executed by the APs. In further embodiments, the software versions may be for software executed by one or more wireless controllers that control the APs.

At step 1015, as detailed above, the network assurance system may train a machine learning-based failure prediction model for the cluster based on a set of features of the APs in the cluster. Example features may include those listed in Table 1 above and/or any other AP features that may be relevant to predicting whether a given AP is likely to fail. In various embodiments, the model may be able to predict a failure as a probability value (e.g., there is a 90% probability of failure) and/or with a predicted time or timeframe of failure.

At step 1020, the network assurance system may proactively trigger a client in the network to roam from a first AP to a second AP, based on the failure prediction model predicting a failure of the first AP, as described in greater detail above. In some embodiments, the network assurance system may cause the first AP to send an indication of the failure to the client, such as part of a custom 802.15.4 TLV. For example, the first AP may notify the client of a predicted probability of failure and/or time of failure, thereby allowing the client to select whether to initiate roaming. In further embodiments, the network assurance system may also determine whether the second AP is a viable candidate to which the client may roam. Such information may be used to control, for example, whether to signal to the client that the client should actually start roaming.

At step 1025, as detailed above, the network assurance system may quarantine the failure prediction model when a new software version is associated with one or more of the APs. Notably, while the model may have been trained across a set of versions, a new version of software may or may not have the same profile. In other words, whenever a new version of software is deployed into the network, the trained model may or may not be able to accurately predict AP failures. Accordingly, the network assurance service may prevent the model from triggering proactive client roaming until an assessment has been made as to whether the model is accurate for the new software version. If not, the service may initiate re-training of the model, as needed. Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the prediction of wireless access point failures using machine learning. Such predictions can be used, in many cases, to proactively trigger clients to roam away from an access point that is predicted to fail. In some aspects, the techniques herein also allow for the behavioral clustering of software versions, as well as a quarantine mechanism, so as to allow the system to adapt to new software versions that could affect these predictions.

While there have been shown and described illustrative embodiments that provide for prediction wireless access point failures, it is to be understood that various other adaptations and modifications may be made within the spirit and scope of the embodiments herein. For example, while certain embodiments are described herein with respect to using certain models for purposes of predicting failures, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments is herein.

What is claimed is:

1. A method comprising:
   forming, by a device of network assurance system that monitors a network, a cluster of similarly behaving wireless access points (APs), wherein the cluster comprises APs associated with different software versions;
   training, by the device, a machine learning-based failure prediction model for the cluster based on a set of features of the APs in the cluster;
   proactively triggering, by the device, a client in the network to roam from a first AP to a second AP, based on the machine learning-based failure prediction model predicting a failure of the first AP; and
   quarantining, by the device, the machine learning-based failure prediction model when a new software version is associated with one or more of the APs,
   wherein quarantining the machine learning-based failure prediction model comprises:
   assessing, by the device, whether to initiate retraining of the machine learning-based failure prediction model based on the new software version.

2. The method as in claim 1, wherein forming the cluster of similarly behaving APs comprises:
   using an unsupervised learning-based clustering approach on monitored behavioral data from the APs.

3. The method as in claim 1, wherein training the machine learning-based failure prediction module for the cluster based on the set of features of the APs in the cluster comprises:
   sub-sampling features from the set of features that are associated with non-failure events.

4. The method as in claim 1, wherein proactively triggering the client in the network to roam from the first AP to the second AP, based on the machine learning-based failure prediction model predicting a failure of the first AP, comprises:
   sending a likelihood indication of the predicted failure to the client, wherein the client elects to roam to the second AP based in part on the likelihood indication.

5. The method as in claim 1, wherein quarantining the machine learning-based failure prediction model comprises:
   using the machine learning-based failure prediction model to predict failures of the one or more APs that are using the new software version; and
   assessing whether the predicted failures of the one or more APs that are using the new software version satisfy an objective function in terms of precision and recall.

6. The method as in claim 5, further comprising:
   un-quarantining the machine learning-based failure prediction model by allowing the machine learning-based failure prediction model to again proactively trigger clients to roam between APs in the network, based on whether the objective function is satisfied.

7. The method as in claim 5, further comprising:
   initiating the retraining of the machine learning-based failure prediction model, based on a determination that the objective function is not satisfied.

8. The method as in claim 1, wherein proactively triggering the client in the network to roam from the first AP to the second AP, based on the machine learning-based failure prediction model predicting a failure of the first AP, comprises:
   determining that the client should roam to the second AP; and
   sending an indication of the second AP to the client, to cause the client to roam to the second AP.

9. The method as in claim 1, further comprising:
   initiating the retraining of the machine learning-based failure prediction model, based on a number of AP failures in the network exceeding a defined threshold.

10. The method as in claim 1, wherein the software versions are versions of software executed by controllers that control the wireless APs.

11. An apparatus, comprising:
    one or more network interfaces to communicate with a network that comprises a plurality of sensors and actuators;
    a processor coupled to the one or more network interfaces, the processor to execute one or more processes; and
    a memory to store a process executable by the processor, the process when executed comprising:
    forming a cluster of similarly behaving wireless access points (APs), wherein the cluster comprises APs associated with different software versions;
    training a machine learning-based failure prediction model for the cluster based on a set of features of the APs in the cluster;
    proactively triggering a client in the network to roam from a first AP to a second AP, based on the machine learning-based failure prediction model predicting a failure of the first AP; and
    quarantining the machine learning-based failure prediction model when a new software version is associated with one or more of the APs,
    wherein the apparatus quarantines the machine learning-based failure prediction model by:
    assessing whether to initiate retraining of the machine learning-based failure prediction model based on the new software version.

12. The apparatus as in claim 11, wherein the apparatus forms the cluster of similarly behaving APs by:
    using an unsupervised learning-based clustering approach on monitored behavioral data from the APs.

13. The apparatus as in claim 11, wherein the apparatus trains the machine learning-based failure prediction module for the cluster based on the set of features of the APs in the cluster by:
    sub-sampling features from the set of features that are associated with non-failure events.

14. The apparatus as in claim 11, wherein the apparatus proactively triggers the client in the network to roam from the first AP to the second AP, based on the machine learning-based failure prediction model predicting a failure of the first AP, by:
    sending a likelihood indication of the predicted failure to the client, wherein the client elects to roam to the second AP based in part on the likelihood indication.

15. The apparatus as in claim 11, wherein the apparatus quarantines the machine learning-based failure prediction model by:

using the machine learning-based failure prediction model to predict failures of the one or more APs that are using the new software version; and assessing whether the predicted failures of the one or more APs that are using the new software version satisfy an objective function in terms of precision and recall.

16. The apparatus as in claim 15, wherein the process when executed is further comprises:

un-quarantining the machine learning-based failure prediction model by allowing the model to again proactively trigger clients to roam between APs in the network, based on whether the objective function is satisfied.

17. The apparatus as in claim 15, wherein the process when executed is further comprises:

initiate the retraining of the machine learning-based failure prediction model, based on a determination that the objective function is not satisfied.

18. The apparatus as in claim 11, wherein the apparatus proactively triggers the client in the network to roam from the first AP to the second AP, based on the machine learning-based failure prediction model predicting a failure of the first AP, by:

determining that the client should roam to the second AP; and sending an indication of the second AP to the client, to cause the client to roam to the second AP.

19. The apparatus as in claim 11, wherein the process when executed is further comprises:

initiate the retraining of the machine learning-based failure prediction model, based on a number of AP failures in the network exceeding a defined threshold.

20. A tangible, non-transitory, computer-readable medium storing program instructions that cause a device of a network assurance system that monitors a network to execute a process comprising:

forming, by the device, a cluster of similarly behaving wireless access points (APs), wherein the cluster comprises APs associated with different software versions;

training, by the device, a machine learning-based failure prediction model for the cluster based on a set of features of the APs in the cluster;

proactively triggering, by the device, a client in the network to roam from a first AP to a second AP, based on the machine learning-based failure prediction model predicting a failure of the first AP; and quarantining, by the device, the machine learning-based failure prediction model when a new software version is associated with one or more of the APs, wherein quarantining the machine learning-based failure prediction model comprises:

assessing, by the device, whether to initiate retraining of the machine learning-based failure prediction model based on the new software version.

\* \* \* \* \*

UNITED STATES PATENT AND TRADEMARK OFFICE
CERTIFICATE OF CORRECTION

| | | |
|---|---|---|
| PATENT NO. | : 11,080,619 B2 | Page 1 of 1 |
| APPLICATION NO. | : 15/864578 | |
| DATED | : August 3, 2021 | |
| INVENTOR(S) | : Vasseur et al. | |

It is certified that error appears in the above-identified patent and that said Letters Patent is hereby corrected as shown below:

In the Specification

Column 19, Line 11, please amend as shown:
embodiments herein.

In the Claims

Column 21, Line 9, please amend as shown:
when executed further comprises:

Column 21, Line 16, please amend as shown:
when executed further comprises:

Column 22, Line 2, please amend as shown:
when executed further comprises:

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*